UNITED STATES PATENT OFFICE.

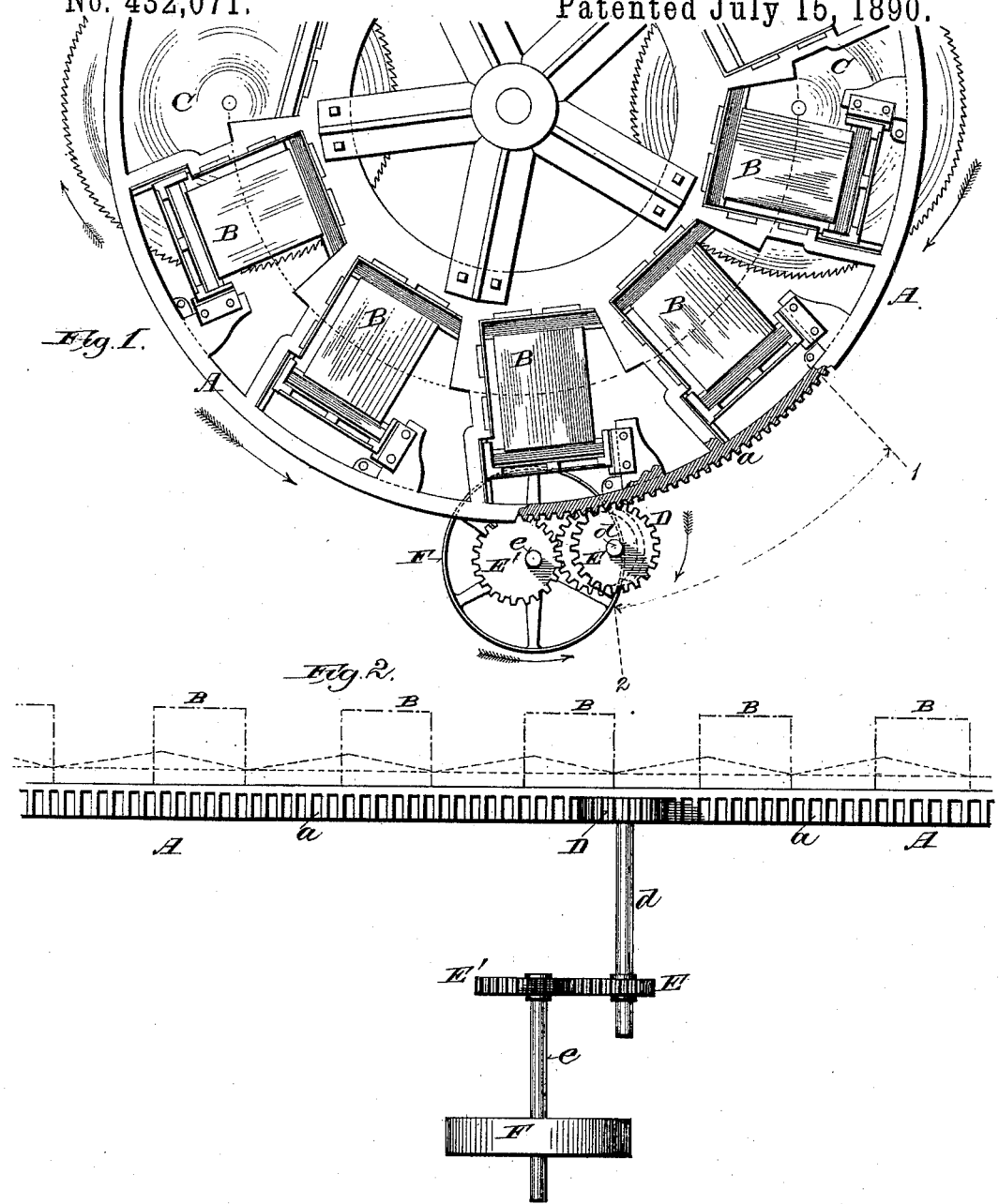

PIKE PIERSON, OF GRAND RAPIDS, MICHIGAN, ASSIGNOR TO GEORGE CHALLONER'S SONS, OF OSHKOSH, WISCONSIN.

FEEDING MECHANISM FOR SHINGLE-SAWING MACHINES.

SPECIFICATION forming part of Letters Patent No. 432,071, dated July 15, 1890.

Application filed September 2, 1889. Serial No. 322,712. (No model.)

*To all whom it may concern:*

Be it known that I, PIKE PIERSON, of Grand Rapids, in the county of Kent and State of Michigan, have invented certain new and useful Improvements in Feeding Mechanism for Shingle-Sawing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to retard the movement of the bolt-carriage as the saw enters a shingle bolt or block and to accelerate its movement after the saw has entered the bolt or block and while the space between the bolts is passing the cutting-edge of the saw.

It consists, essentially, of certain peculiarities in the construction and arrangement of the carriage-feeding mechanism, hereinafter particularly described, and pointed out in the claims.

In the accompanying drawings like letters designate the same parts in both figures.

Figure 1 is a plan view of a portion of a rotary-carriage shingle-sawing machine to which my improvements are applied, and Fig. 2 is a side elevation of the feeding mechanism by which the foregoing object is attained.

A represents a rotary carriage provided on the periphery with a rack $a$ and furnished with a series of circular bolt-receptacles, each provided with suitable mechanism for dogging the bolts or blocks B B in place to be operated upon by the saw or saws C C.

D is a pinion or gear mounted upon the upper end of a vertical shaft $d$ and meshing with the rack $a$ on the periphery of the carriage A.

E E' are a pair of similar eccentric gears mounted one upon the shaft $d$ and the other upon a parallel vertical shaft $e$, so as to work upon a parallel vertical shaft e, so as to work together. The shaft $e$ is provided with a pulley F, which is connected by a belt with any suitable driving-pulley, or it may be connected by any suitable driving mechanism with the source of power. The gear D is so proportioned to the rack $a$, with which it works, as to move the carriage the distance from the side of one bolt to the corresponding side of the next bolt, as indicated by the dotted lines 1 2, Fig. 1, to each revolution of said gear, and the eccentric gears E E' are so arranged that the teeth adjacent to the shortest radius of the driver E' will engage with the teeth adjacent to the longest radius of the driven gear E when the saws are entering the bolts. By this construction and arrangement of the driving mechanism the movement of the bolts will be slowest as the cutting-edges of the saws are entering them and will be gradually accelerated as the cuts are made to intermediate points in the bolts, after which the movement is retarded until the next succeeding bolts arrive at the cutting-edges of said saws, as graphically shown by dotted lines in Fig. 2.

In practice I adjust the carriage-feeding mechanism so that the movement of the carriage will be slowest approximately as the bolts reach the saws at the inception of the cuts and will be fastest at points a little past the middle of the cuts; but within certain limits tne points of minimum and maximum speed with reference to the saw-cuts may be varied without material change in results.

In place of the eccentric gears E E' shown, other well-known forms of irregular gears or mechanism for producing a variable feed may be employed.

I claim—

1. In a shingle-sawing machine, the combination, with a rotary bolt-carriage provided with a number of bolt-receptacles, of feeding mechanism connected therewith and comprising a pair of eccentric gears by which an intermittingly retarded and accelerated movement in a single direction is imparted to said carriage and the bolts are caused to move slowly at the inception of the cuts and their movement is accelerated after the saw has entered the cuts, substantially as and for the purposes set forth.

2. In a shingle-sawing machine, the combination, with a rotary bolt-carriage provided with a series of bolt-receptacles, of feeding mechanism connected therewith and arranged to impart to said carriage an intermittingly retarded and accelerated rotary movement in a single direction, whereby the saw is caused to enter a cut slowly and the movement of the carriage is accelerated after the saw has entered a cut, substantially as and for the purposes set forth.

3. In a shingle-sawing machine, the combination, with a rotary carriage provided with a circular rack, of feeding mechanism consisting of a gear or pinion meshing with said rack and a pair of intermeshing irregular gears, one mounted upon the pinion-shaft and the other upon a separate driving-shaft which is connected with a suitable source of power, whereby an intermittingly retarded and accelerated movement in a single direction of the bolts with reference to the saw is produced, substantially as and for the purposes set forth.

In testimony that I claim the foregoing as my own I affix my signature in presence of two witnesses.

PIKE PIERSON.

Witnesses:
   THOMAS GOULDEN,
   S. S. CHIPMAN.